US008636933B2

(12) United States Patent
Gilg et al.

(10) Patent No.: US 8,636,933 B2
(45) Date of Patent: Jan. 28, 2014

(54) PRESSED POWDER ELEMENTS

(75) Inventors: Franz X. Gilg, Polling (DE); Bartholomaeus Daisenberger, Weilheim (DE); Helmut Ostenrieder, PeiBenberg (DE)

(73) Assignee: Weckerle GmbH, Wielheim (DE)

( * ) Notice: Subject to any disclaimer, the term of this patent is extended or adjusted under 35 U.S.C. 154(b) by 204 days.

(21) Appl. No.: 12/850,984

(22) Filed: Aug. 5, 2010

(65) Prior Publication Data

US 2011/0031642 A1 Feb. 10, 2011

(30) Foreign Application Priority Data

Aug. 4, 2009 (EP) .................................... 09167149

(51) Int. Cl.
*B29C 43/14* (2006.01)

(52) U.S. Cl.
USPC .......................................... 264/120; 425/404

(58) Field of Classification Search
USPC .......................................... 264/120; 425/404
See application file for complete search history.

(56) References Cited

U.S. PATENT DOCUMENTS

2006/0185671 A1* 8/2006 Durr et al. ................ 128/203.15

FOREIGN PATENT DOCUMENTS

| | | | |
|---|---|---|---|
| DE | 2848505 A1 | | 5/1980 |
| EP | 0300519 | * | 6/1988 |
| EP | 0300519 A1 | | 1/1989 |
| JP | 62114907 | | 5/1987 |
| JP | 62167721 | | 7/1987 |
| JP | 62215515 | | 9/1987 |
| JP | 63203300 | | 8/1988 |

OTHER PUBLICATIONS

W118381EP, European Search Report for International Application No. 09167149.5 dated May 25, 2010, 11 pages.

* cited by examiner

*Primary Examiner* — Yogendra Gupta
*Assistant Examiner* — Robert J Grun
(74) *Attorney, Agent, or Firm* — Warner Norcross & Judd LLP

(57) ABSTRACT

Method for producing a pressed powder element, wherein the method comprises pre-pressing of loose powder to a first powder blank (14), pre-pressing of loose powder to a second powder blank (15) and pressing together the at least two pre-pressed powder blanks (14, 15) to form a pressed powder element as well as the corresponding apparatus.

11 Claims, 3 Drawing Sheets

PRESSED POWDER ELEMENTS

RELATED APPLICATIONS

This application claims priority to European Patent Application 09167149.5, filed on Aug. 4, 2009.

FIELD OF THE INVENTION

The invention concerns a method and an apparatus for producing pressed powder elements from powder blanks, which are pre-pressed from a particular volume of cosmetic loose powder.

BACKGROUND

The pressing of dust, powder, pellet or granular material, which also encompasses cosmetic powder is used everywhere, where these materials shall be brought into a solid form by pressing, such that an easier handling and an easier transport or an easier subsequent processing can be ensured. Thereby, the base material is commonly a mixture of different components, which each are in a dust, powder, pellet or granular condition and which have been mixed respectively prepared in such condition for forming the pressed material. Cosmetic powders commonly consist of a filler phase, a binder phase as well as a color giving phase and an active phase. The binder phase can basically be a separate phase or can be realized by an oil component, which is spread upon the filler phase.

In the cosmetic industry methods for compacting of powders are often used in the powder production. In the powder production for example loose powder is poured into a pressing pan and is subsequently pressed in the pressing pan by means of a die. For example U.S. Pat. No. 4,884,061 describes a system in which a cosmetic material is poured into a pressing pan and the cosmetic material is then subsequently compressed in this pressing pan by means of a die. The pressing pan itself is then subsequently delivered as part of the cosmetic material and forms for example an inlet for powder and/or a make-up case. Commonly for commercial purposes on top of such produced cosmetics, there is a lettering placed on top of the pressed material in form of an accumulation of cosmetic material. This has the disadvantage that already after a few uses the accumulation of the material is ablated, such that the lettering is not recognizable anymore. A first solution to this problem is described in US 2009/0041698 A1. Here a pressed powder element is created by means of a form. The form is thereby of such type that the form comprises a plurality of fillable regions. These regions can for example form the lettering as well as the bordering. These different regions can also be filled with different loose powders. Since the regions extend over the whole height of the form also a lettering, which is produced by these regions, is completely embedded in the powder element and not as described above only superimposed on it. After the filling, the form is removed and the still loose powder is pressed together to a powder element. Thus, a powder element is created, which for example comprises a lettering which extends over the complete height of the pressed powder element and which therefore can not be ablated by using the powder element.

In the systems known in the art, there exists however the problem of exactly filling the press apparatuses respectively the form. Thereby, it is in particular problematic that the powder poured into the forms is not distributed homogenously in the press apparatus respectively the form or that when different powders are used they already can mix in loose condition.

Further, the filling as described in the art is often performed by a system as for example described in the German patent DE 1 284 612, which describes a feeder. Thereby, it can not always be ensured that all material can be filled in the designated recess. A large amount of the material remains on the edges, rims and areas. This leads to the problem that not all materials can be used. Furthermore, when a material is changed an extensive cleaning has to be performed, such that the remaining material does not accidentally contaminates the new material. In particular, if a feeder is used for filling a form with two different powders as described in US 2009/0041698 A1 this problematic is given, namely that the loose powders can mix with each other. This can lead to the problem that for example the color of the lettering can be distorted by contaminating the loose powder with powder, which has a different color giving phase. Further, it can not be ensured that an optical sharp separation between powders, for example powders with different colors can be created. Furthermore, it can also not be ensured by such filling that the material is evenly distributed in the recess or in the container. This leads to the problem that also after pressing the material the material is pressed differently strong at different places. For example at places where before the pressing there was a lot of material the material is very strongly pressed, whereas at places where before the pressing there was only little bit material, the material is only pressed to a certain degree and is therefore still relatively loose.

Furthermore, in the systems as described in the art it is only with a lot of effort possible to adjust the apparatuses to the different materials respectively forms and colors in order to produce various batches of different material with the same quality. In particular, the above described filling also exhibits the problem of the exact dosing, since a homogeneous distribution of the material in a filling process can not always be ensured. Further, for every change in the lettering a new form has to be produced, which again is very time and cost consuming.

Therefore, there exist a need to provide a method and an apparatus with which pressed powder elements can be produced, without exhibiting the disadvantages of the prior art, in particular with regards to the mixture of loose powders when filling the forms. This need is fulfilled by the subject-matter of the independent claim.

SUMMARY OF THE INVENTION

The method for producing a pressed powder element according to the invention comprises the pre-pressing of loose powder into a first powder blank as well as the pre-pressing of loose powder into a second powder blank and the subsequently pressing together of the at least two pre-pressed powder blanks to form a powder element. The pre-pressing of the loose powder into powder blanks can thereby for example be performed in a compression chamber by means of a movable die, which decreases the volume, which is available for the loose powder in the compression chamber, and therefore the powder is mechanically pressed and/or the pre-pressing is performed pneumatically by means of a negative pressure created in the compression chamber. Thereby, for example the volume available for the loose powder in the compression chamber can be used as dosage metric for the loose powder during the feeding process of the powder, such that after the feeding process, the loose powder can be with a high dosage accuracy be pre-pressed to powder blanks. Therefore, in a first step the loose powder is pre-pressed to a powder blank. The pre-pressed powder blanks have the advantage over loose powder that no mixture of the powder can occur and that the powder blanks can easier be processed and trans-ported as well as arranged next to each other without the necessity of a form. Further, the powder blanks have the advantage that they can be produced in a steady quality and high numbers without the disadvantage that it comes to inhomogeneous fillings of the form as the case for pour fillings, which can lead by pressing them together to the disadvantage that the pressed powder elements do not have the same quality throughout. According to the invention at least two of the pre-pressed powder blanks are pressed together in another step to form a pressed powder element. The production of pressed powder elements by means of pre-pressing loose powder to powder blanks exhibits the advantage that no mixture of the powder can occur and that the powder blanks can be used as a modular system. By means of this modular system, it is possible that one pressed powder element can be formed from at least two pre-pressed powder blanks by pressing them together, such that when the powder blanks are arranged together a pattern, image, lettering or design can be formed, which extends through the complete height of the pressed powder element and which therefore also does not fade when using the powder element. The utilization of powder blanks makes it also possible that optical sharp dividing lines in the powder element can be created, as for example between two different colors.

Thereby, the method according to the invention can for example comprise that the loose powder is pneumatically pre-pressed to a first powder blank in a first compression chamber by means of a created negative pressure and that the pre-pressing of the second powder blank from loose powder is also pneumatically performed in a second compression chamber by means of a created negative pressure. Alternatively or additionally the pre-pressing according to the invention of the loose powder to a first powder blank can also comprise mechanically pre-pressing the loose powder in a first compression chamber by means of a die moveable in the first compression chamber and the pre-pressing of the second powder blank can comprise mechanically pre-pressing the loose powder in a second compression chamber by means of a die moveable in the second compression chamber.

The pre-pressing of the loose powder to a first powder blank from loose powder can also be performed pneumatically in a first compression chamber by means of a created negative pressure and the pre-pressing of the second powder blank from loose powder can also be performed pneumatically in the first compression chamber by means of a created negative pressure subsequently to pre-pressing the first powder blank. Alternatively or additionally the pre-pressing according to the invention of the loose powder to a first powder blank can also comprise mechanically pre-pressing the loose powder in a first compression chamber by means of a die moveable in the first compression chamber and the pre-pressing of the second powder blank can comprise mechanically pre-pressing of the loose powder in the first compression chamber by means of a die moveable in the first compression chamber, subsequently to pre-pressing the first powder blank.

Thereby, the pre-pressing can also comprise adjusting the volume of a compression room by means of the movable die, whereby the die bottom seals with sidewalls of the compression chamber, such that a compression room is formed and pre-pressing of the fed loose powder into a powder blank is performed by means of the die and/or by means of a created negative pressure. By means of the adjustable volume of the compression room, also the amount of the loose powder which is going to be pressed can exactly be adjusted. Therefore, by this volume it is defined, how much powder can be fed into the compression room. Thereby, by means of the adjustable volume it is also ensured that every time the same batches of loose powder are pre-pressed to a powder blank, such that for example the height of the pre-pressed powder blanks is always the same. Also, by means of the adjustable volume, it can be accounted for different characteristics of the different powders. If for example two different powders are pressed to two powder blanks and subsequently pressed to a powder element, then it is important that both pre-pressed powder blanks exhibit the same height. In order to achieve the same height for different powders, it can be necessary that for the both powder blanks different amounts of powders are required. This can easily be realized by means of the compression rooms, which volumes can be adjusted independently from each other. The same height of pre-pressed powder blanks ensures that the powders of the at least two powder blanks are not mixed with each other when pressing them together to a pressed powder element.

The at least two pre-pressed powder blanks can also for example be pre-pressed from different loose powders, such that the at least two pre-pressed powder blanks for example exhibit a different color or comprise a different active component. Thereby, the separate pre-pressing allows to account for the different characteristics of different loose powders.

For example, in the pre-pressing according to the invention the pressure exerted when pre-pressing the powder blanks can be beneath the pressure, which activates the binder phase in the loose powder, such that the binder phase for example can subsequently be activated when pressing them together according to the invention in order to connect the at least two pre-pressed powder blanks to one powder element. In contrast, the powder blanks created during the pre-pressed process for example only stick together by means of adhesion, such that the blanks have the form of the cross section of the apparatus in which they are pre-pressed and they hold this form because of adhesion. Thereby, the shape of the at least two powder blanks and the corresponding apparatuses in which they are pre-pressed can be in such a way that the powder element after pressing the at least two powder blanks according to the invention together is of a particular form. The pressing together according to the invention can for example, as described above, also be performed using a pressure exerted upon the pre-pressed powder blanks, whereby this pressure is selected such high that the binder phase in the at least two pre-pressed powder blanks is activated. For example, by activating the binder phase, the pre-pressed powder blanks can form a solid powder element, when they are pressed together. Alternatively, the pressure can also lead to a mechanical adhesion of the two pre-pressed powder blanks without activating the binder phase. Thereby, the pressing together of the at least to powder blanks can comprise that they are pressed together in a pan, whereby the pressing together is performed by means of a die, which exerts pressure upon the at least two powder blanks. In order to ensure that the at least two pre-pressed powder blanks have the same height after the pre-pressing, the means for pre-pressing—in this case the die—can for example be way controlled. However, a person skilled in the art will also realize other possibilities which are suitable to achieved pre-pressed blanks with the same height.

The above described object for producing pressed powder elements can however also be solved by an apparatus according to the invention. The apparatus comprises a first and a second means for pressing loose powder into a first and a second powder blank as well as means for pressing the at least two powder blanks together for forming a pressed powder element. Thereby, the loose powder is pre-pressed with the first means for pre-pressing loose powder into a first powder blank and is pre-pressed with the second means for pre-pressing of loose powder into a second powder blank, subsequently with the means for pressing the at least two pre-pressed powder blanks are pressed together for forming a pressed powder element.

Thereby, the first means for pre-pressing the first powder blank and the second means for pre-pressing the second powder blank can be of a similar form. Alternatively, also the first means for pre-pressing the first powder blank can be the same means as the second means for pre-pressing the second powder blank, whereby the at least two powder blanks are pressed after one another.

Thereby, the pre-pressing according to the invention of the loose powder to powder blanks and the subsequent pressing together of the powder blanks can be realized with different means. In one embodiment one of the means for pre-pressing can for example comprise a compression chamber in which the loose powder is pre-pressed into a powder blank. Thereby, the compression chamber for example comprises a die with a die bottom, wherein the die is moveable in the compression chamber. The die bottom is arranged in such a way that it seals with the walls of the compression chamber and therefore forms a compression room inside the compression chamber. The volume of the compression room can be adjusted by means of the position of the die bottom in the compression chamber. Therefore, by means of this adjustable volume, the loose powder can be exactly dosed and it can be accounted for different characteristics of different loose powder by means of decreasing respectively increasing the adjustable volume. Additionally to the capability of adjusting the volume by means of the position of the die bottom, the volume can also be changed by other means. For example, the walls of the compression chamber can be changed or exchanged. The loose powder can be fed into the compression room by means of a feeding line and thereby can be exactly dosed by ease of the adjustable volume. The feeding line thereby represents a connection between a storage reservoir in which the loose powder is stored and the compression room. Additionally, also further feeding lines for example for further different powders can lead into the compression room. Thereby, the one respectively the plurality of feeding lines can also directly be arranged at the die. Thereby, the die can for example be hollow and can be by means of the feeding line be connected with the storage reservoir. Alternatively, the feeding line can also be directly connected with the die bottom. When the movable die is inserted further into the compression chamber starting from its originally position then the volume of the compression room is decreased, such that the volume which is available for the fed loose powder is decreased, whereby a mechanically pre-pressing of the loose powder into a powder blank is achieved.

Further, the means for pre-pressing can also comprise a connection between the compression chamber and a pressure line. By means of this pressure line a negative pressure can be created by means of which the loose powder can be sucked from the storage reservoir into the compression room. Also by means of the created negative pressure, the loose powder can be pneumatically pre-pressed to a powder blank. The pressure line can thereby directly be arranged at the die. For creating the negative pressure, which is necessary for sucking in the loose powder, there can be a negative pressure source or a positive pressure source be connected to the pressure line by means of a valve. For example, the positive pressure- and negative pressure source can also be realized by one pneumatic apparatus, which for example is capable of creating positive pressure respectively negative pressure. By means of the negative pressure source a negative pressure can be created in the compression chamber via the pressure line. By means of the positive pressure source a positive pressure can be created, which for example can be used to allow an easier removal of the mechanically and/or pneumatically pre-pressed powder blank from the die bottom. Thereby, the gas pressure of the exerted positive pressure can be used to overcome the adhesion force of the pre-pressed blank at the die bottom and therefore makes it easier to remove the blank respectively to loosen it completely from the die bottom. Thereby, the exerted positive pressure can be in a two-stage form, in the first stage for example only a low positive pressure can be exerted, which can be used to loosen the pre-pressed powder blank from the die bottom and in a second stage for example a higher positive pressure can be used, which after the removal of the pre-pressed powder blank can be used for removing any powder remains pneumatically from the die bottom.

In order to prevent that loose powder can get into the pressure line, the compression room can also comprise a filter. Thereby, when the negative pressure is provided in the compression room, the loose powder is sucked into the compression room, however, the loose powder can not exit the compression room in direction of the pressure line. The filter can also for example be arranged in a wall of the compression chamber.

Further, for example also the die bottom of the die can separate the compression chamber into two regions one region in which the feeding line leads into and another region in which the pressure line leads into. In one preferred embodiment, the means for pre-pressing, the die bottom can for example comprise a filter and thereby represent a connection between the two regions. Preferably, the pressure line has a direct connection to the filter in the die bottom. Therefore, the pressure line can for example directly lead into the die. Through the filter, the negative pressure can be provided in the compression room and the loose powder can be sucked into the compression room.

Thereby, the filter can consist of a mechanically resilient material. The filter can for example be a metallic fabric. Preferably, the filter is realized by a metal plate with holes. Such a metal plate is advantageously, since the metal plate has a high durability. Furthermore, the metal plate can also withstand high pressures. The hole size in the metal plate is preferably selected in such a way that the powder granulates can not penetrate the holes. But also larger holes are possible, since the different powder granulates commonly wedge together such that they block the holes and can not leave the compression room through the holes. Thereby, the holes preferably only make out 20% of the die bottom area.

In one preferred embodiment, the filter can also be made out of a sintered metal, which for example can be welded at the end of the die bottom or the sintered metal can represent the die bottom itself.

The filter can also comprise several elements, for example, the filter can consist of two or a plurality of the above described metal plates, which are preferably arranged above each other. Also the filter can comprise a coarse supportive fabric, which is mechanically resilient and which for example comprises several layers whereby a fine filter fabric is arranged between the supportive fabric layers. Additionally or alternatively one or several membranes, for example consistent of fleece can be used in front of or behind the metal plate or the other filter element respectively the other filters elements. Thereby, a powder loss through the vacuum line can be minimized.

If a negative pressure is created in the compression room through the pressure line, then this negative pressure spreads through the filter into the whole compression room and therefore allows a uniform distribution of the loose powder in the compression room.

In order to prevent damage of a pressure source connected with the pressure line also means for filtering can be arranged in the pressure line. This means for filtering can be ranged behind the above described filter and therefore closer to the pressure source therefore a commonly used membrane can be used, since this membrane does not have to withstand the pressures exerted in the pressure room.

Further, an early clogging of the filter can be prevented by the measure that the filter is arranged at a top wall of the compression room. Thereby, this wall can quasi be the sealing of the pressure room or the top areas of the sidewalls of the pressure room. This leads to the fact that the loose powder, which is sucked into by the negative pressure at least partially frees the filter or a part of the filter by means of gravity.

By means of the above described apparatus and the different embodiments exactly dosed powder blanks can be pre-pressed from the loose powder, which are required for the method for producing a powder element according to the invention. Thereby, the first and the second means for pre-pressing the powder blanks can also be realized by only one of the above described apparatuses, such that the powder blanks are pre-pressed after one another. When the loose powder is pre-pressed by means of the first and second means for pre-pressing, then the powder blanks can be arranged in an arbitrary form. Subsequently the arranged powder blanks can for example by means of a hydraulic, servo mechanical or servo hydraulic die be pressed together. Thereby, the pre-pressed powder blanks can for example be arranged next to each other in a pan.

The described arrangement of the pre-pressed powder blanks can for example be also achieved by directly pre-pressing the powder blanks in a pan. For example, a first powder blank can be pre-pressed in the pan by the above described first means for pre-pressing of loose powder and subsequently the pan can be moved forward to a second means for pre-pressing, such that subsequently a second powder blank next to the first powder blank can be pre-pressed. Alternatively also several of the above described means for pre-pressing can be arranged next to each other in such a way that the pre-pressed powder blanks can be simultaneously arranged in their final position in the pan and can be pressed together. For this purpose, for example the above described compression chambers of the means for pre-pressing can comprise very thin walls. Thereby at least one part of the wall is at least a part of the wall for two different compression chambers. Thereby, the at least two powder blanks can for example be pre-pressed parallel next to each in at least two means for pre-pressing, arranged adjacent to each other. The arrangement of the means for pre-pressing thereby also determine the final position of the powder blanks in the pan. Therefore, for example the pan can be arranged beneath the means for pre-pressing which are arranged in a specific way and subsequently in the at least two means for pre-pressing the loose powder, the powder blanks can be pre-pressed and can be deposited simultaneously into the pan. In a final press process the pre-pressed powder blanks can then be pressed together into a powder element. Thereby, for example the binder in the powder can be activated. By this, a powder element can be produced in a simple way, wherein the power element comprises several powder blanks consistent of different powders, for example powders with different colors.

By means of the above described means for pre-pressing powder blanks, it is enabled that powder blanks can be produced with high dosage accuracy and that these powder blanks comprise a good homogenous powder distribution. Therefore there is no place in the powder blank, which comprises more powder compared to the other places as it is often the case in the prior art. This is in particular also necessary, since otherwise when pressing the powder blanks together, it can not be ensured that the resulting powder element comprises a homogeneous distribution and therefore would not comprise a sufficient stability.

BRIEF DESCRIPTION OF THE DRAWINGS

In the following the invention is further described by reference to the schematic illustrations shown in the figures, wherein.

DETAILED DESCRIPTION OF THE INVENTION

Figure 1:
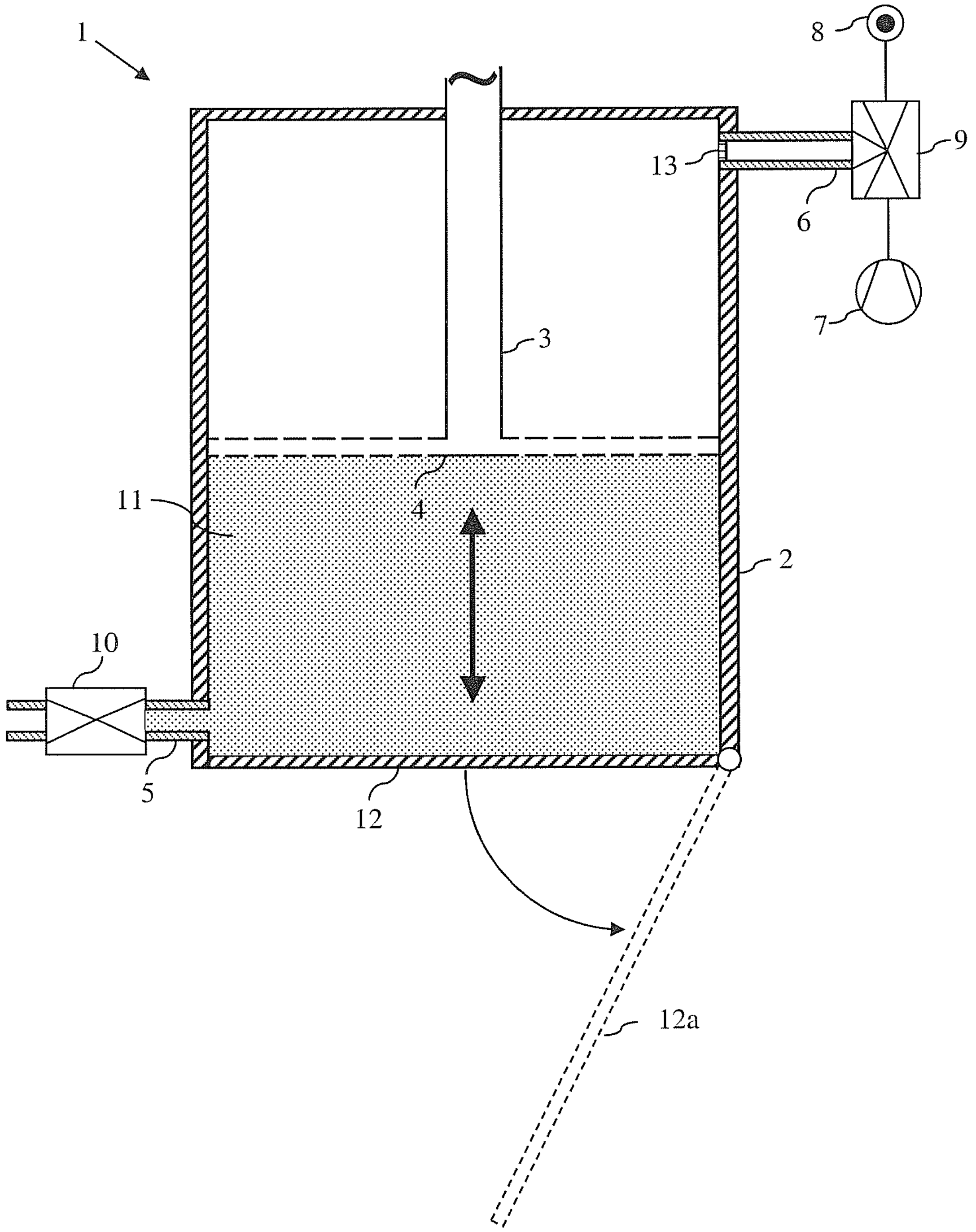
FIG. 1 shows a schematic cross section of an embodiment of a means for pre-pressing of powder blanks from loose powder.

FIG. 1 shows a schematic cross section of an embodiment of a means for pre-pressing 1 of powder blanks from loose powder. In the here shown embodiment a compression chamber 2 forms with a moveable die 3 and with a die bottom 4, a compression room 11. The volume of the compression room 11 is adjustable according to the position of the die 3. According to the desired thickness of the pressed powder blank or dependent upon which loose powder is used, the die can be adjusted. A feeding line 5 leads into the compression room 11 over a valve 10. By means of this feeding line 5, the loose powder can be sucked into the compression room 11. Therefore, at first a negative pressure is created in the compression chamber 2. The negative pressure in this example is created via a pressure line 6 arranged in the upper region of compression chamber 2 and connected to a negative pressure source 7 over a valve 9. Through a filter in the die bottom 4 of die 3, the negative pressure can spread throughout the compression chamber 2. If the valve 10 of the feeding line 5 is opened, then by means of the negative pressure, which is eminent in the compression chamber 2, the loose powder is sucked from a storage reservoir (here not shown) via the feeding line 5 into the compression room 11. Thereby, the die bottom 4 of die 3 defines with the walls of the compression chamber 2 a defined volume. This defined volume is used for accurately dosing the loose powder and can be changed according to the corresponding application and desired dosage by changing the position of the die bottom 4 in the compression chamber 2.

When the powder is fed from the storage reservoir into the compression room 11, a constant negative pressure can be hold by the negative pressure source 7, thereby the first pneumatic pre-pressing of the loose powder is achieved. The holes in the filter are thereby preferably so small selected that only a minimal part of the loose powder can be sucked through the holes. For very small granulated loose powders or powder components this is hard to realize. In order to prevent eventual contamination of pressure line 6, as well as a contamination of the connected negative pressure source 7, in this embodiment a means for filtering in form of an exchangeable membrane 13 at the lead out of pressure line 6 is arranged. This membrane 13 collects miniscule components, which eventually have come through the holes of the filter, when sucking in the loose powder. Is the compression room 11 filled with the desired amount of loose powder, then the valve 10 of the feeding line 5 is closed and the die bottom 4, in this embodiment, is moved downwards, such that by decreasing the volume available for the loose powder in the compression room 11*a* mechanically pre-pressing of the loose powder is achieved. In one embodiment simultaneously a further negative pressure is exerted by the negative pressure source 7, such that simultaneously to the mechanically pressing of the loose powder the loose powder is also pneumatically condensed. After a desired pressing level of the loose powder is achieved, a closeable opening 12, in this embodiment the bottom of the compression chamber 2 is opened and brought into the open condition 12*a*. Thereby, for example the negative pressure source 7 can further exert a negative pressure in order to hold the pressed blank at the die bottom 4. When the closeable opening 12 is completely opened then by shifting the valve 9 it can be switched between a negative pressure source 7 and a positive pressure source 8. The positive pressure source 8 can in the here depicted embodiment for example subsequently exert a two stage positive pressure in the compression chamber 2 above the die bottom 4. Through the holes in the filter, the force exerted by the gas pressure can be transferred to the pressed blank at the die bottom 4 of die 3, when the force exerted by the gas pressure exceeds the adhesion force of the pressed powder at the die bottom 4 of die 3, then the pressed blank is loosened from the die bottom 4 of die 3. The loosened pressed blank can in the here depicted embodiment be removed through the opened bottom 12*a* of compression chamber 2 respectively can fall out of this opening. Further by means of the positive pressure powder remains can be removed from the filter. Thereby a first positive pressure stage with a minimal positive pressure (for example 0.1 bar) can be used to loosen the pre-pressed powder blank from the die bottom 4 and a second positive pressure stage with a higher positive pressure (for example 2 to 8 bar) can be used to remove eventual powder remains from the filter.

Figure 2:
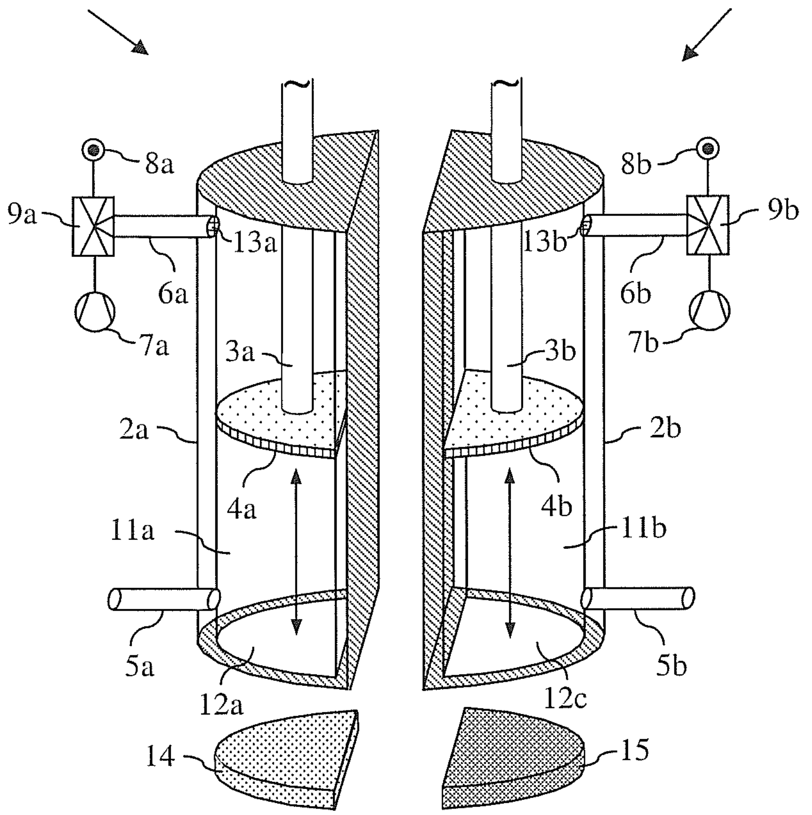
FIG. 2 shows a three dimensional schematic illustration of two means for pre-pressing two semi circle powder blanks from loose powder, wherein the means are arranged adjacent to each other.

FIG. 2 shows a three dimensional view of two described means for pre-pressing 1*a*, 1*b* of powder blanks 14, 15 as shown in FIG. 1. Thereby loose powder is sucked into the compression rooms 11*a*, 11*b* via the feeding lines 5*a*, 5*b* leading into the compression rooms 11*a*, 11*b* by means of negative pressure created by negative pressure sources 7*a*, 7*b*. Thereby, the two feeding lines 5*a*, 5*b* can each lead to different storage reservoirs (here not shown), such that in each of the two means for pre-pressing 1*a*, 1*b* a powder blank 14, 15 of different loose powders can be pre-pressed. The dies 3*a*, 3*b* insertable into compression rooms 11*a*, 11*b* are thereby used for the mechanically pressing of the loose powders. If the loose powder has achieved a desired pressing level, then the powder blanks 14, 15 can be removed through the closeable openings 12*a*, 12*c*, from the compression rooms 11*a*, 11*b*. Thereby, the positive pressure sources 8*a*, 8*b* can provide a supporting positive pressure into the compression chambers 2*a*, 2*b* above die bottoms 4*a*, 4*b*, such that the force exerted by the gas pressure makes it easier to remove the powder blanks 14 and 15, respectively, the force exerted by the gas pressure is so high that the powder blanks 14, 15 are completely removed by themselves from the die bottoms 4*a*, 4*b* and fall out of the opened closeable openings 12*a*, 12*c*. By means of the means for pre-pressing 1*a*, 1*b* as shown in this embodiment for example two semi circle powder blanks 14, 15 can be pre-pressed, which can be arranged in such a way that they form a full circle. Thereby the arrangement of the powder blanks can also be given by the arrangement of the means for pre-pressing. For example, the two means for pre-pressing 1*a*, 1*b* of powder blanks 14, 15 can also be arranged adjacent to each other in such a way that the two semi circle shaped means for pre-pressing 1*a*, 1*b* form a full circle. Thereby, for example the walls of the compression chambers 2*a*, 2*b* can be very thin and for example a part of the wall of compression chamber 2*a* can be simultaneously at least be part of the wall of compression chamber 2*b*. In such arranged means for pre-pressing 1*a*, 1*b* two semi circle powder blanks 14, 15 can be pressed in parallel. If subsequently a pan is arranged beneath the means for pre-pressing 1*a*, 1*b*, then the two semi circle shaped powder blanks 14 and 15 can be transferred directly into a full circle arrangement into the pan. Also, the means for pre-pressing arranged in such a way can be used to press the two powder blanks in a pan adjacent to each other, such that the powder blanks are directly in a full circle arrangement inside the pan. If the powder blanks 14, 15 which are arranged in such a way are then subsequently be pressed together, then they form a full circle powder element. This is shown in FIG. 3.

Figure 3:
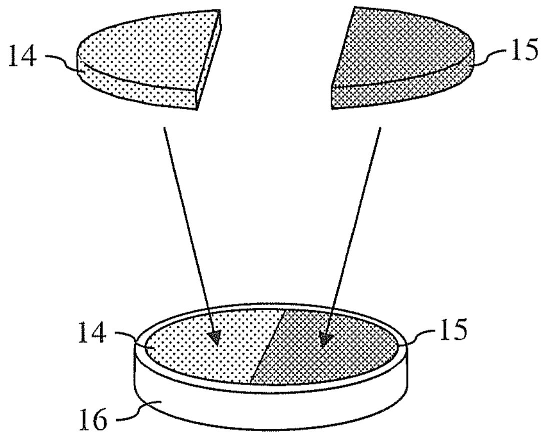
FIG. 3 shows a schematic view of a full circle powder element in a pan consistent of two different semi circle powder blanks.

FIG. 3 shows a schematically view of a powder element consistent of two powder blanks 14, 15 in a pan 16. Thereby the two powder blanks 14, 15 can for example be produced by means for pre-pressing 1*a*, 1*b*, as shown in FIG. 2. The powder blanks 14, 15 produced in such a way, here shown in two different shadings, can be for example be arranged after the pre-pressing adjacent to each other in a pan 16, such that both semi circle shaped powder blanks 14, 15 form a full circle in the pan 16. If for example then a mechanical pressure is exerted upon the powder blanks 14, 15 which are arranged adjacent to each other, then the two powder blanks form a full circle shaped powder element. Thereby, for example, the binder phase in the pre-pressed powder blanks 14, 15 can be activated, such that the both powder blanks 14, arranged adjacent to each other are pressed together to connect to a full circle shaped powder element. The pan 16 serves as limiter for the pre-pressed powder blanks 14, 15, such that they are not dislocated when they are pressed together respectively the pre-pressed powder can not go out of shape. The pan 16 can also serve as a supporting pan for the pressed powder element, such that the powder element together with the pan 16 can be used in a powder case. The here exemplarily shown method for producing a powder element consistent of two semi circle shaped powder blanks 14, 15 can also be realized with various numbers of powder blanks, which have different forms, such that by using several powder blanks it is possible to create different patterns, images, designs or letterings in one powder element. An example for the usage of several different shaped powder blanks is shown in the following figures.

Figure 4:
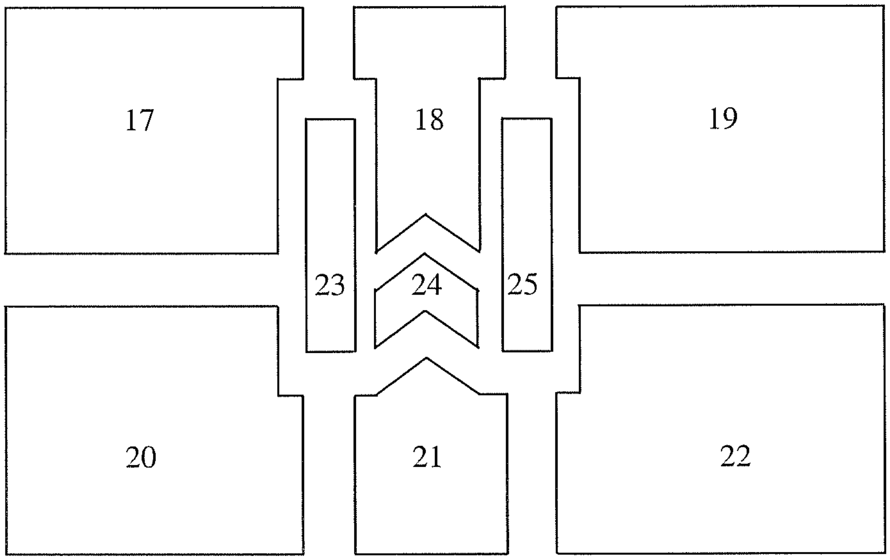
FIG. 4 shows different cross sections of means for pre-pressing powder blanks.

FIG. 4 shows different cross sections 17, 18, 19, 20, 21, 22, 23, 24, 25 for means for pre-pressing 1, 1*a*, 1*b* of loose powder as shown in FIGS. 1 and 2. By means of the here shown examples of cross sections 17, 18, 19, 20, 21, 22, 23, 24, 25 nine different shaped powder blanks with a different outer form can be created. Hereby, the cross sections 17, 18, 19, 20, 21, 22, 23, 24, 25 create a pattern, here for example the letter "W". Thereby, the cross sections 17, 18, 19, 20, 21, and 22 form the outer surrounding of the letter and the cross sections 23, 24, 25 form the letter itself. Here also other arbitrary cross sections can be realized, which together form an arbitrary pattern, image or design. Thereby, it is not always necessary to create one form for all pattern parts, since symmetries can be used. In the here shown example for example a desired powder blank of form 19 can be created by rotating a blank of form 17. The same is true for forms 20 and 22 as well as for 23 and 25. Also by separating the patterns differently other symmetries can be created, such that the number of required means for pre-pressing 1, 1*a*, 1*b* with different cross sections can be minimized. However, thereby the cross sections of the means for pre-pressing 1, 1*a*, 1*b* shall allow an optimal distribution of the powder in the compression rooms 11, 11*a*, 11*b* without the problem that by eventually unfavorably geometries a homogeneous distribution of the loose powder, when sucked in and during the subsequent pre-pressing is prevented. A homogeneous distribution can also for example be supported by the fact that the means for pre-pressing 1, 1*a*, 1*b* for example have several feeding lines through which the loose powder can be sucked in, such that also with unfavorably geometrics a homogeneous distribution can be ensured.

The cross sections 17, 18, 19, 20, 21, 22, 23, 24, 25 as shown in this example and the powder blanks with the corresponding cross sections created by means for pre-pressing 1, 1*a*, 1*b* can for example be used to create according to the method of the invention letterings, patents, designs or pictures in powder elements. An example therefore is shown in FIG. 5.

Figure 5:
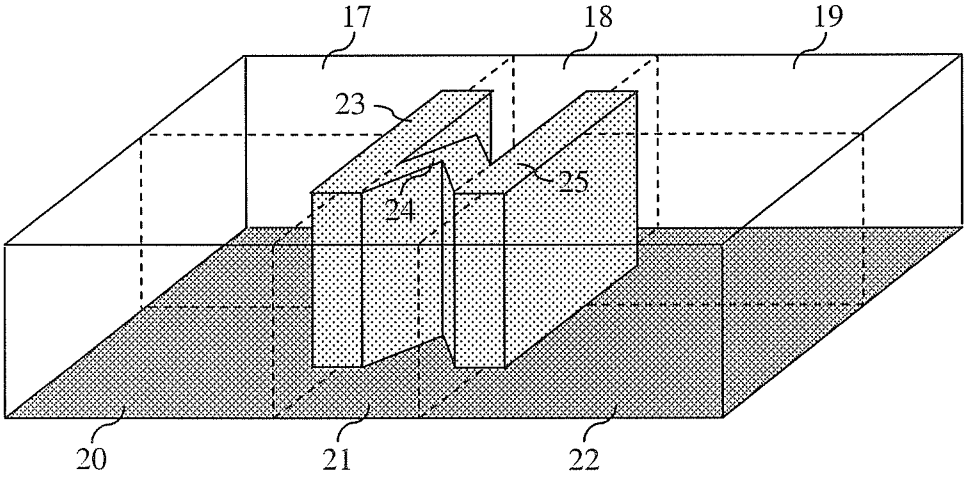
FIG. 5 shows a three dimensional example of several pressed together powder blanks with cross sections as shown in FIG. 4.

FIG. 5 shows a three dimensional example of several composed pressed powder blanks with cross sections 17, 18, 19, 20, 21, 22, 23, 24, 25 as shown in FIG. 4. The pre-pressed powder blanks with the cross sections 17, 18, 19, 20, 21, 22, 23, 24, 25 as shown in FIG. 4 can for example be placed in a pan 16, as shown in FIG. 3 in a pattern similar to the one as shown in FIG. 5, such that for example the here shown nine pre-pressed powder blanks form the letter "W". Preferably the inner blanks which form the letter, have a different color giving phase as the surrounding blanks such that the pattern or the lettering is distinguishable from the surrounding powder. When the pre-pressed blanks are pressed by the means for pre-pressing 1, 1*a*, 1*b* and are arranged in the desired pattern, then they are pressed in a final pressing process for example a by hydraulic, servo mechanic or servo hydraulic operated die. In this final pressing process can for example the binder phase in the powder be activated, such that the different blanks can be pressed together to a compact powder block namely the powder element, as it is used for example in powder cases. By pressing together these different powder blanks it is easily possible to produce a pressed powder element, which comprises several pre-pressed powder blanks from different powders, for example powders with different colors. By means of this method as described above, all kinds of letterings can be created. In particular, the advantage of this lettering consistent of powder is given by the fact that the lettering extends throughout the hole height of the pressed powder element, therefore the lettering is not an accumulation of powder, which is superimposed onto the pressed powder element or pressed into it as often the case in other powders, such that even if the pressed powder element is used and the thickness of the powder element is changed the lettering and the aimed commercial purpose is still ensured. The same is also true for patterns or other designs, which can be created by the described composition of differently shaped pre-pressed powder blanks. This composition also allows that letterings, patterns, designs can be created in different colors or by different powders with eventually different active phases. A further advantage is that the different powder blanks can be separately produced in advance and can be produced on stock. This makes it possible that the powder blanks can be used as a modular system. This has the advantage that not as commonly necessary new forms have to be produced, therefore the utilization of pre-pressed powder blanks for producing powder elements leads to a time and costs saving over the systems as known in the art.

The invention claimed is:

1. Method for producing a pressed powder element, wherein the method comprises the following steps:

adjusting a volume of a compression room (11) formed between a die (3) moveably disposed in a compression chamber (2) and side walls of the compression chamber (2), wherein the volume of the compression room (11, 11*a*, 11*b*) is adjustable by the position of the die (3) in the compression chamber (2);

creating a negative pressure in the compression room (11) for sucking loose powder from a storage reservoir into the compression room (11), wherein the adjustable volume of the compression room (11) is used for dosing the loose powder which is sucked from the storage reservoir into the compression room (11);

pre-pressing of loose powder sucked into the compression room (11*a*) to a first powder blank (14);

pre-pressing of loose powder sucked into the compression room (11*b*) to a second powder blank (15); and pressing together the at least two pre-pressed powder blanks (14, 15) to form a pressed powder element.

2. The method according to claim 1, wherein the pre-pressing of the loose powder sucked into the compression room (11) to a first powder blank (14) comprises, pneumatically pre-pressing the loose powder sucked into a first part (11*a*) of the compression room (11*a*) in a first a first part (2*a*) of the compression chamber (2) by means of a created negative pressure and the pre-pressing of the second powder blank (15) comprises, pneumatically pre-pressing the loose powder sucked into a second part (11*b*) of the compression room (11) in a second part (2*b*) of the compression chamber (2) by means of a created negative pressure.

3. The method according to claim 1, wherein the pre-pressing of the loose powder sucked into the compression room (11) to a first powder blank (14) comprises, mechanically pre-pressing of the loose powder sucked into a first part (11*a*) of the compression room (11) in a first part (2*a*) of the compression chamber (2) by means of a first die (3*a*) moveable in the first part (2*a*) of the compression chamber (2) and the pre-pressing of the second powder blank (15) comprises, mechanically pre-pressing of the loose powder sucked into a second part (11*b*) of the compression room (11) in a second part (2*b*) of the compression chamber (2) by means of a die (3) moveable in the second compression chamber (2*b*).

4. The method according to claim 1, wherein the pre-pressing of the loose powder sucked into the compression room (11) to a first powder blank (14) comprises, pneumatically pre-pressing of the loose powder sucked into the compression room (11) in the compression chamber (2) by means of a created negative pressure and the pre-pressing of the second powder blank (15) comprises, pneumatically pre-pressing of the loose powder sucked into the compression room (11) in the first compression chamber (11) by means of a created negative pressure after the first powder blank (14) is pre-pressed.

5. The method according to claim 1, wherein the pre-pressing of the loose powder sucked into the compression room (11) to a first powder blank (14) comprises, mechanically pre-pressing of the loose powder sucked into the compression room (11) in a first compression chamber (2) by means of a die (3) moveable in the compression chamber (2) and the pre-pressing of the second powder blank (15) comprises, pneumatically pre-pressing of the loose powder sucked into the compression room (11) in first compression chambers (2) by means of a created negative pressure after the first powder blank (14) is pre-pressed.

6. The method according to claim 1, wherein the pressure exerted when pre-pressing the powder blanks (14, 15) is beneath the pressure, which activates the binder phase in the loose powder.

7. The method according to claim 1, wherein the at least two powder blanks (14, 15) are pre-pressed from different loose powders.

8. The method according to claim 1, wherein the shaping of the at least two powder blanks (14, 15) is designed in such a way that the powder element after pressing together the at least two powder blanks (14, 15) has a particular shape.

9. The method according to claim 1, wherein during pressing together the at least two powder blanks (14, 15), pressure is exerted upon the pre-pressed powder blanks (14, 15), wherein the pressure is selected to be high enough such that the pressure can activate the binder phase in the at least two pre-pressed powder blanks (14, 15).

10. The method according to claim 1, wherein the pressing together of the at least two powder blanks (14, 15) comprises, pressing together the at least two powder blanks (14, 15) in a pan (16).

11. The method according to claim 1, wherein the pressing together of the at least two powder blanks (14, 15) comprises, mechanically by means of a die exerting pressure upon the at least two powder blanks (14, 15).

* * * * *